United States Patent [19]

Kostrewa

[11] Patent Number: 4,860,884
[45] Date of Patent: Aug. 29, 1989

[54] BUCKET CONVEYOR, PARTICULARLY FOR UNLOADING SHIPS

[75] Inventor: Ludwig Kostrewa, Moers, Fed. Rep. of Germany

[73] Assignee: Fried. Krupp Gesellschaft mit beschränkter Haftung, Essen, Fed. Rep. of Germany

[21] Appl. No.: 204,982

[22] Filed: Jun. 10, 1988

Related U.S. Application Data

[63] Continuation of Ser. No. 24,797, Mar. 11, 1987, abandoned.

Foreign Application Priority Data

Mar. 12, 1986 [DE] Fed. Rep. of Germany ....... 3608116

[51] Int. Cl.⁴ ............................................. B65G 17/36
[52] U.S. Cl. .................................... 198/509; 198/710; 414/141.1
[58] Field of Search ......................... 198/509, 709–712, 198/716; 414/141.1, 142.2, 142.5

[56] References Cited

U.S. PATENT DOCUMENTS

| | | |
|---|---|---|
| 1,421,787 | 4/1922 | Kininmonth . |
| 4,336,877 | 6/1982 | Gill ...................................... 198/509 |
| 4,518,079 | 5/1985 | Paelke ............................... 198/861.2 |

FOREIGN PATENT DOCUMENTS

| | | |
|---|---|---|
| 3150562 | 6/1983 | Fed. Rep. of Germany . |
| 3435479 | 4/1986 | Fed. Rep. of Germany . |
| 0103033 | 8/1981 | Japan . |
| 0003736 | 1/1982 | Japan . |
| 59-78012 | 5/1984 | Japan . |
| 59-212324 | 12/1984 | Japan . |
| 1112537 | 5/1968 | United Kingdom . |

Primary Examiner—Robert J. Spar
Assistant Examiner—Lyle K. Kimms
Attorney, Agent, or Firm—Spencer & Frank

[57] ABSTRACT

A bucket conveyor including self-scooping bucket elements, a support structure, and a mechanism for displacing the elements over a closed path along the support structure for conveying bulk material from a region below the structure to a region in the vicinity of the top of the support structure, the closed path having two substantially parallel reaches, each reach having a vertical portion. The support structure includes: a vertically oriented upper member extending from the region of the top of the support structure; a lower member connected to the upper member for pivotal movement relative to the upper member; and a base member connected to the lower member for pivotal movement relative to the lower member and having a longitudinal dimension which is inclined to the vertical and protrudes laterally from the structure. The base member is connected to the lower member in a manner such that the base member can be positioned so that its longitudinal dimension is horizontal for any angular position of the lower member relative to the upper member.

17 Claims, 3 Drawing Sheets

BUCKET CONVEYOR, PARTICULARLY FOR UNLOADING SHIPS

This application is a continuation of application Ser. No. 024,797, filed Mar. 11, 1987, now abandoned.

BACKGROUND OF THE INVENTION

The present invention relates to a bucket conveyor provided with a self-scooping bucket assembly or the like.

A bucket conveyor of this type is disclosed in Japanese Utility Model Patent 82/3736. The lower, pivotal part of this bucket conveyor is pivotal only over a limited angular range between two different oblique positions and is therefore able to receive bulk material to its full capacity only at correspondingly inclined slopes. Moreover, the lateral projection of its lower member is so short that deep recesses to the side, as they frequently occur when unloading ships, cannot be reached at all.

SUMMARY OF THE INVENTION

It is an object of the present invention to provide a bucket conveyor of the above-mentioned type with which practically all unloading tasks, as they occur particularly while unloading ships, can be performed without substantial losses in performance.

The above and other objects are achieved, according to the present invention, by a bucket conveyor having means including self-scooping bucket elements, a support structure, and means for displacing the elements over a closed path along the support structure for conveying bulk material from a region below the structure to a region in the vicinity of the top of the support structure, the closed path having two substantially parallel reaches, each reach having a substantially vertical portion, wherein the support structure comprises: a vertically oriented upper member extending from the region of the top of the support structure; a lower member connected to the upper member for pivotal movement relative to the upper member about a first horizontal axis; a base member having first and second ends and connected to the lower member via the first end for pivotal movement relative to the lower member about a second horizontal axis and having a longitudinal dimension which is inclined to the vertical and protudes laterally from the structure; a guide roller at the second end of the base member for causing each reach of the path to have a horizontal portion and for guiding the displacing means between the two reaches of the path; and bucket guide means located in the region where the lower member is connected to the upper member, for guiding the two reaches; the displacing means being movable in a direction such that the reach whose substantially vertical portion is more remote from the first horizontal axis moves upwardly and the horizontal portion of that reach is below the horizontal portion of the other reach, and the base member being connected to the lower member in a manner such that the base member can be positioned so that its longitudinal dimension is horizontal for any angular position of the lower member relative to the upper member.

A bucket conveyor for unloading ships which possesses a number of the features of embodiments of the present invention, is disclosed in FRG-OS 3,150,562, but this ship unloader has not one, but two, pivotal members whose lower ends are articulated to a base member, which are arranged symmetrically to one another and can be spread in this arrangement only over a small angle. This ship unloader is thus complicated and its uses are limited.

The present invention brings about the advantage that the novel bucket conveyor is able to pass through relatively small passage openings, e.g. those of hatches, and has a long reach from there in all directions. Due to the fact that the base member is kept horizontal, economic operation can be realized while maintaining the surface of the bulk material horizontal.

All endless conveyors or other linked belts suitable to accommodate materials and equipped with buckets or similar containers can be used for the bucket assembly.

Advantageous embodiments of the invention are described below and in the claims.

The invention will be described in greater detail below with reference to embodiments which are schematically illustrated in the drawings.

DESCRIPTION OF THE PREFERRED EMBODIMENTS

Figure 1:
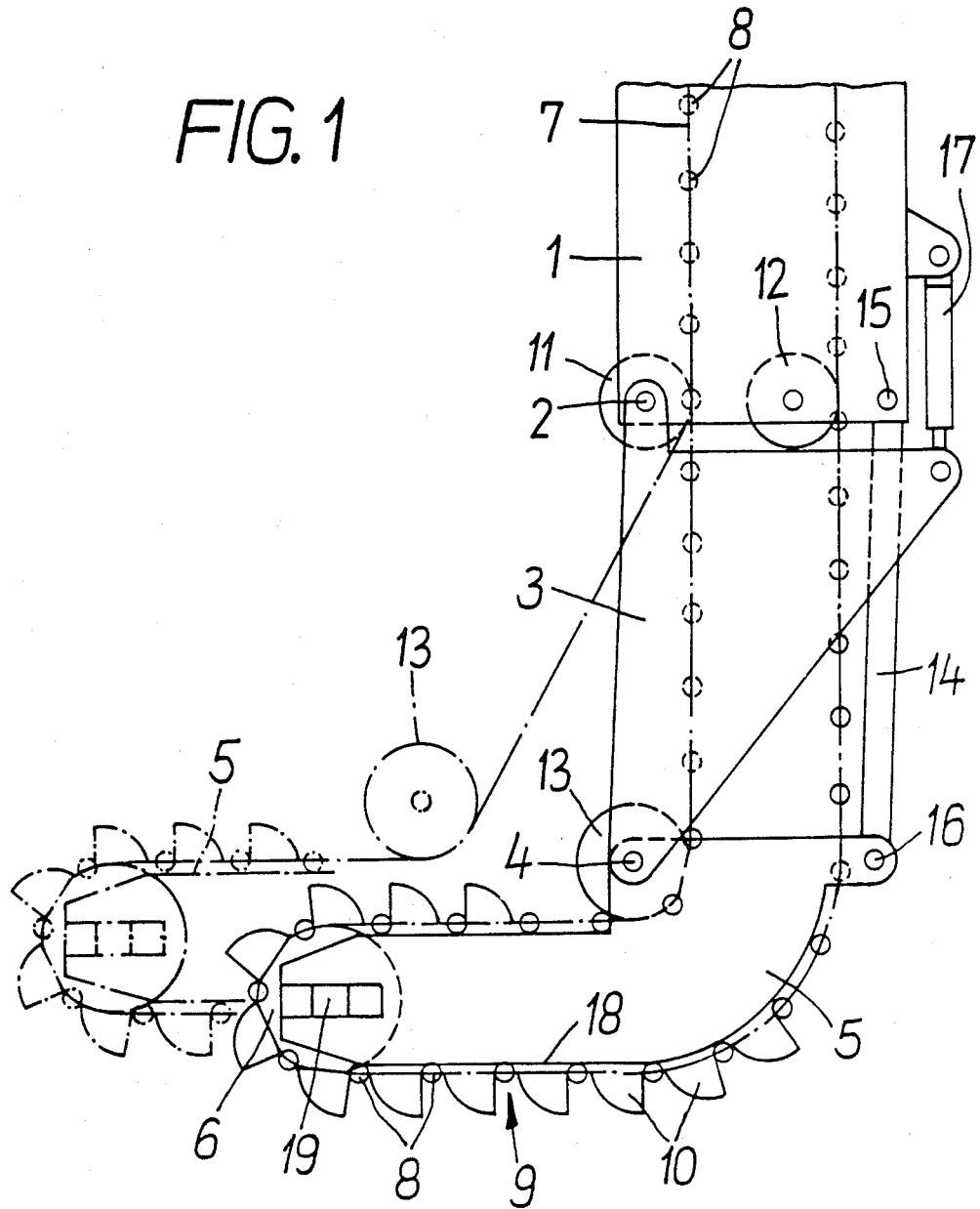
FIGS. 1, 2 and 3 are elevational side views of three preferred embodiments of a ship unloader according to the invention, in which the upper part of the unloader is suspended from a crane bridge or a crane boom (not shown).

The ship unloader in the form of a bucket conveyor as shown in FIG. 1 includes a support structure having a vertically extending upper member 1 which is pivotal about a vertical axis and to which is articulated a lower member 3 which is pivotal relative to member 1 about a horizontal axis 2. Lower member 3 has approximately the shape of a triangle when seen from the side with its apex oriented downwardly. At the lower end of lower member 3, the support structure additionally includes; a base member 5 which is articulated so as to be pivotal relative to member 3 about a horizontal axis 4 which is parallel to axis 2. Base member 5 projects in the pivoting direction of lower member 3 and is provided at its outer end with a guide roller 6.

A bucket assembly 9 provided with rollers 8 carried by a link chain assembly 7 extends over the entire length of the bucket conveyor. Assembly 9 is guided on the support structure in such a manner that its two reaches essentially remain at a fixed distance from one another. Each roller 8 is disposed between two buckets 10 and is arranged at both sides of buckets 10 of bucket assembly 9 at the ends of the buckets that face one another. In the region of the upper articulation point of lower member 3, two guide rollers 11 and 12 in the form of tumblers are mounted in such a way that they support the two reaches of bucket assembly 9 when member 3 is pivoted out. The axes of rollers 11 and 12 lie in a common horizontal plane with axis 2. Likewise at the pivoting side, in the region of the articulation between base member 5 and lower member 3, there is a further guide roller 13 in the form of a tumbler which is mounted in base member 5. Each guide roller is equipped with two tumbler disks which are in engagement with the link chain assembly.

Typically, link chain assembly 7 is composed of two link chains spaced apart transversely to the conveying direction and buckets 9 are enclosed between the two link chains. Each link chain is associated with a respective group of rollers 8.

At the side opposite the pivot points of the bucket conveyor, there is disposed a guide 14 in the form of a plate or a truss which is connected with upper member 1 at a pivot point having a horizontal axis 15 and with base member 5 at a pivot point having a horizontal axis 16. The distance between axes 15 and 16, on the one hand, and between axes 15 and 2 and 16 and 4, on the other hand, is selected so that an articulated parallelogram mechanism results, thus assuring that base member 5 always retains its horizontal orientation during pivoting, as indicated by the pivoted-out position which is shown in dash-dot lines. The pivoting is effected by a pair of hydraulic cylinders 17 which are articulated outside of guide 14 between upper member 1 and lower member 3.

At its underside, base member 5 has guide rails 18 for rollers 8. These rails extend horizontally from guide roller 6 and then ascend upwardly in an arc toward guide 14. Guide rails 18 support bucket assembly 9 during the scooping process and serve to guide it in the arcuate region. Bucket assembly 9 is kept taut by a tensioning device 19 which serves to adjust guide roller 6 in the direction of the longitudinal extent of base member 5. Tensioning device 19 is equipped with a pair of hydraulic cylinders which act on the axis of guide roller 6 and are provided, as protection against tilting, or canting, with a mechanically or electrically controlled synchronizing device. Tensioning device 19 produces an always constant tension in link chain assembly 7 in that the oil pressure in the hydraulic cylinders of device 19 is kept constant by an appropriate regulating device. Thus guide roller 6 takes up different positions during pivoting with constant tension in link chain assembly 7.

In the normal case, the deflection of lower member 3 from its vertical position, shown in FIG. 1, is no more than about 30°. With an appropriate structural configuration, lower member 3 can be pivoted out far enough, for special cases, that axis 4 of the lower articulation has almost the same elevation as axis 2 of the upper articulation. The hydraulic cylinders of the pair of hydraulic cylinders 17 would then pass to the sides of upper member 1. However, lower member 3 can also be pivoted backwardly beyond the vertical position (which means that the reaches of the bucket assembly are in a vertical position in the region of the lower member) so that the lateral projection of base member 5 is reduced and thus it is possible to pass through narrower passage openings as well.

Figure 2:
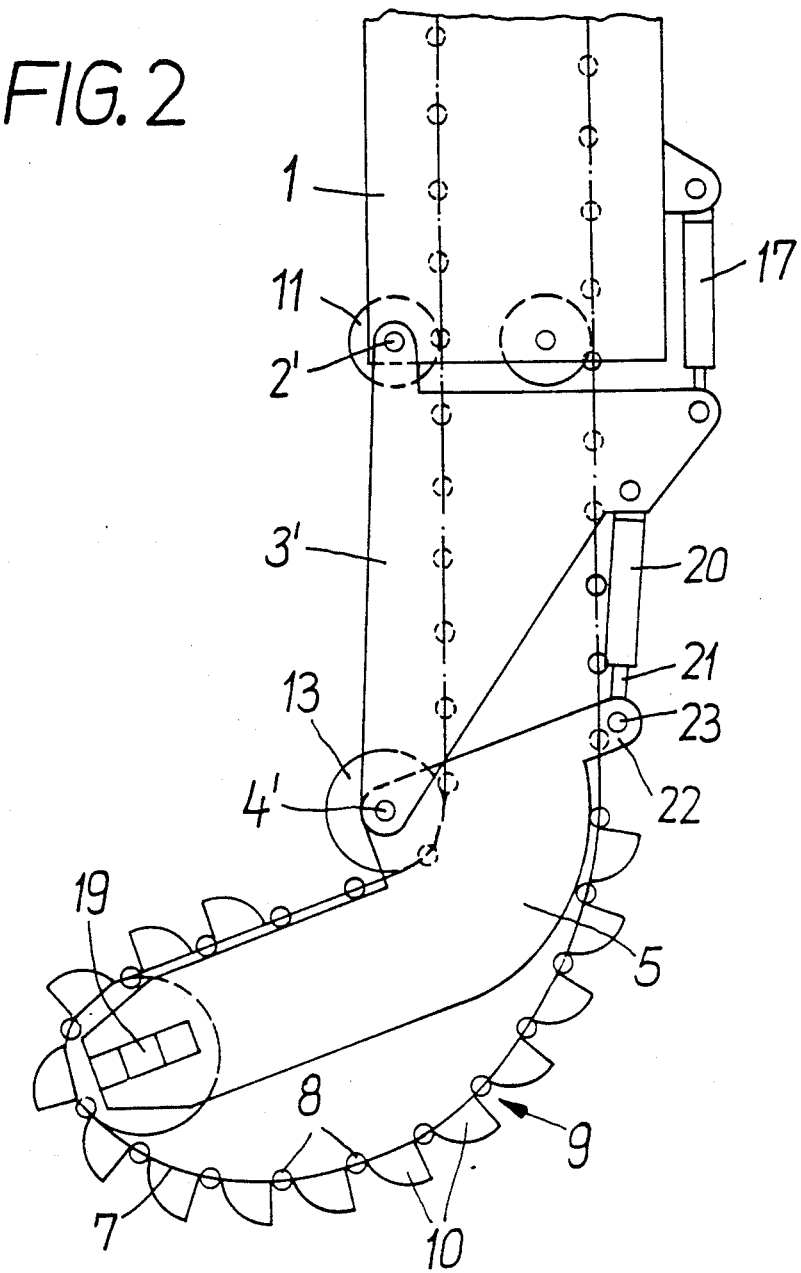

In the embodiment shown in FIG. 2, upper member 1 and base member 5 are constructed in the same manner as in the preceding embodiment and are correspondingly also provided with the same guide rollers 11, 12 and 13, respectively. The lower member 3', which again has a triangular configuration when seen from the side, is articulated to the upper member at a horizontal axis 2' which is coincident with the axis of guide roller 11 and is articulated to base member 5 at a horizontal axis 4' which is coincident with the axis of guide roller 13. Lower member 3' is pivoted by means of a pair of hydraulic cylinders 17. At the side of member 3' opposite its pivot points, a second pair of hydraulic cylinders 20 is articulated. Each cylinder 20 has a piston rod 21 articulated via a horizontal axis 23 to a projection 22 of base member 5.

A suitable control device assures that when lower member 3' is pivoted out to laterally extend base member 5, the pairs of cylinders 17 and 20 move with such a velocity ratio that base member 5 always retains its horizontal orientation. The same is true when the hydraulic cylinders are retracted during a return pivoting movement.

The arrangement of the pair of hydraulic cylinders 20 also makes it possible, as shown in FIG. 2, for the outer end of base member 5 to be lowered, i.e. for base member 5 to be pivoted downwardly. This causes bucket assembly 9 to sag down at the underside of base member 5, thus enabling the buckets to move over the ground without the danger of damage when they take up the remnant of a mass of bulk material. Moreover, the reduction of transverse reach realized by such lowering of base member 5 and the possibility of pivoting lower member 5 back to beyond the extended position enables the conveyor to pass through even narrower passage openings.

Figure 3:
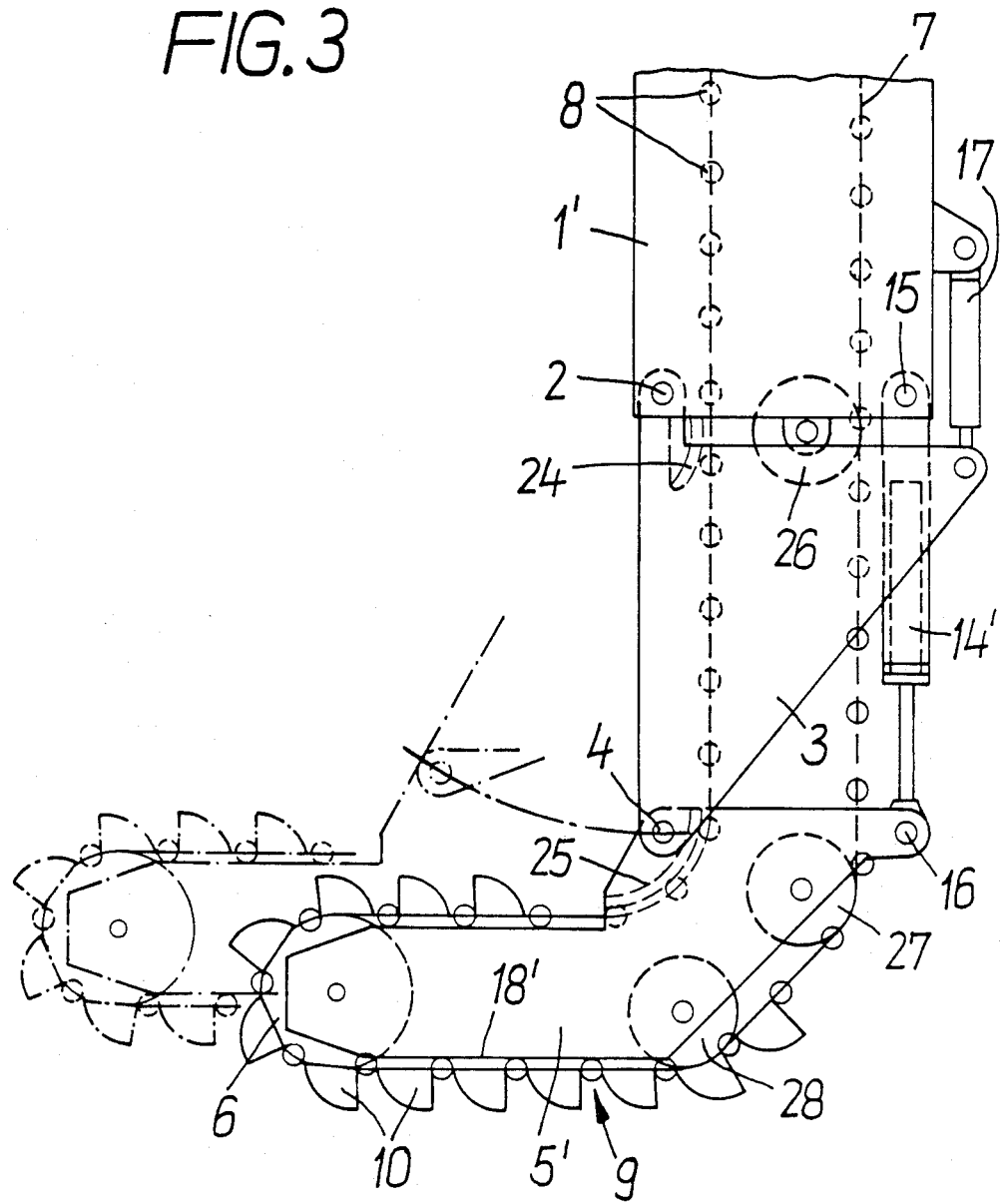

The embodiment of a ship unloader shown in FIG. 3 again includes, in correspondence with the embodiment according to FIG. 1, a parallelogram articulation of base member 5'. Correspondingly, lower member 3 is articulated to upper member 1' at axis 2 and to base member 5' at axis 4. A pair of hydraulic cylinders 17 is again provided to effect pivoting of lower member 3. A guide 14' which is articulated to upper member 1' and base member 5' at horizontal axes 15 and 16, respectively, is constituted by a pair of hydraulic cylinders and is able to pivot base member 5' upwardly from its horizontal position, but is provided primarily to pivot member 5' downwardly. In the region of horizontal axes 2 and 4, there are provided arcuate guides 24 and 25, respectively, as support for the reach of bucket assembly 10 which extends at the side of those axes. Upper guide 24 is disposed at upper member 1' and lower guide 25 is disposed at base member 5'.

The positions of the arcs provided by guides 24 and 25 are selected so that, between the position shown in solid lines and the position in which member 5' projects laterally by the greatest amount, the link chain 7 rolling on the guides always lies against at least part of each arc.

The other ascending reach of the bucket assembly is guided over guide rollers 26, 27 and 28. Guide roller 26 is mounted with its axis somewhat below horizontal axis 2 in upper member 1', while guide rollers 27 and 28 are mounted in base member 5' in such a manner that, in the position shown in solid lines, guide roller 27 establishes a vertical orientation for the ascending reach of bucket assembly 10 and ascending reach is deflected from the vertical by about 45° between guide roller 27 and lower guide roller 28. Rails 18' extend along the underside of base member 5' as far as roller 28. Guide rollers 26, 27 and 28 are again provided with two tumbler disks each for link chain assembly 7, with the latter retaining the same tension during pivoting as in the other two embodiments due to a clamping, or tensioning, device disposed in the head portion (not shown) of upper member 1'.

The projecting length of base member 5, 5' and the length of the pivotal lower member 3, 3' as well as the relationship of these two lengths to one another depends primarily on the conditions given in each individual case.

Generally, however, the projecting length of the base member is shorter but no less than about one-third the length of the lower member, but is at least long enough that a sufficient number of buckets lie against the horizontal guide rails, thus sufficiently filling these buckets in operation.

For the purpose of reducing the lateral projection of base member 5, 5', instead of pivoting the lower member 3, 3' backwardly as already described, upper member 1, 1' may also be mounted for pivotal movement about a horizontal axis. This would also permit an increase in the lateral projection of the bucket conveyor when it is pivoted into the extended position.

But in this case it is necessary to use instead of a rigid element like guide 14, an element which is adjustable in its length like the hydraulic cylinder 20 and which operates the adjustable element so that the base member always retains its horizontal orientation.

The invention now being fully described, it will be apparent to one of ordinary skill in the art that many changes and modifications can be made thereto without departing from the spirit or scope of the invention as set forth herein.

What is claimed is:

1. A bucket conveyor having means, including self-scooping bucket elements, a support structure, and means linking said elements for displacing said elements over a closed path along said support structure, for conveying bulk material from a region below said structure to a region in the vicinity of the top of said support structure, the closed path having two substantially parallel reaches, each reach having a substantially vertical portion and a substantially horizontal portion, wherein said support structure comprises: a vertically oriented upper member extending from the region of the top of said support structure; a lower member connected to said upper member for pivotal movement relative to said upper member about a first horizontal axis; a base member having first and second ends and connected to said lower member via said first end for pivotal movement relative to said lower member about a second horizontal axis and having a longitudinal dimension which is transverse with respect to the vertical and protrudes laterally from said structure; a guide roller at the second end of said base member for guiding said means linking said elements between the two reaches of said path, said horizontal portions of said reaches being disposed one above the other adjacent said guide roller; bucket guide means, located in the region where said lower member is connected to said upper member, for guiding the two reaches; supporting means connected between said upper member and said base member and forming, with said lower member, a parallelogram linkage between said upper member and said base member; and displacement means connected between said upper member and said lower member for pivoting said lower member relative to said upper member; said means linking said elements being movable in a direction such that the reach whose substantially vertical portion is more remote from the first horizontal axis moves upwardly and the horizontal portion of that reach is below the horizontal portion of the other reach, and said base member being connected to said lower member in a manner such that said base member can be positioned so that its longitudinal dimension is horizontal for any angular position of said lower member relative to said upper member.

2. A conveyor as defined in claim 1 wherein said upper member is supported to be pivotable about a vertical axis.

3. A conveyor as defined in claim 1 wherein said guide means comprise at least one guide roller.

4. A conveyor as defined in claim 1 wherein said supporting means is adjustable for varying the orientation of said base member relative to said upper member.

5. A conveyor as defined in claim 4 wherein said supporting means comprise a hydraulic cylinder.

6. A conveyor as defined in claim 1 wherein said displacement means comprises a hydraulic cylinder.

7. A conveyor as defined in claim 1 wherein said means linking said elements extend along said upper and lower members, where said reaches of said closed path are always parallel to one another.

8. A conveyor as defined in claim 1 further comprising means supporting said guide roller for movement relative to said base member in the direction of the longitudinal dimension of said base member.

9. A bucket conveyor, comprising: a support structure which includes
   an elongated upper member which is disposed substantially vertically,
   a lower member connected to the upper member for pivotal movement about a first substantially horizontal axis,
   a base member connected to the lower member for pivotal movement about a second substantially horizontal axis that is spaced apart from the first axis, the base member having a laterally protruding nose end and having another end that is spaced apart from the nose end,
      control means, pivotally connected to the upper member at first point that is spaced apart from the first axis and pivotally connected to the lower member at a second point that is spaced apart from the second axis, for setting the distance between the first and second points, the control means being variable so that the distance between the first and second points can be selectively controlled, and
      additional means, pivotally connected to the base member at a third point that is spaced apart from the second axis and from the nose end of the base member and pivotally connected to one of the upper member and the lower member at a fourth point that is spaced apart from the first axis and from the first point, for setting the distance between the third and fourth points;
   an endless conveyor having buckets mounted thereon; and
   guide means, including a guide roller mounted adjacent the nose end of the base member, for movably mounting the conveyor on the support structure, with the conveyor having a lower portion which loops around the guide roller and an upper portion which follows the upper member,
   wherein the third point is positioned adjacent the another end of the base member, the distance between the third point and the nose end being greater than the distance between the second axis and the nose end.

10. The bucket conveyor of claim 9, wherein the base member is generally L-shaped and has a long leg which terminates at the nose end and a short leg which terminates at the another end, the second axis and third point being positioned on the short leg of the base member.

11. The bucket convey of claim 10, wherein the lower member is generally triangular, with the first axis, second axis, and second point being disposed adjacent the apex angles of the triangle.

12. The bucket conveyor of claim 11, wherein the upper member has a bottom end, the first axis being disposed adjacent the bottom end of the upper member and the first point being disposed above the first axis.

13. The bucket conveyor of claim 9, wherein the guide means further comprises another guide roller mounted at the first axis and a further guide roller mounted at the second axis.

14. The bucket conveyor of claim 9, wherein the control means comprises a hydraulic cylinder.

15. The bucket conveyor of claim 9, wherein the additional means comprises an elongated member having a length which does not change, and wherein the fourth point is disposed on the upper member.

16. The bucket conveyor of claim 9, wherein the additional means comprises another hydraulic cylinder, and wherein the fourth point is disposed on the lower member.

17. The bucket conveyor of claim 9, wherein the additional means comprises another hydraulic cylinder, and wherein the fourth point is disposed on the upper member.

* * * * *